(12) United States Patent
Thomas et al.

(10) Patent No.: US 11,825,771 B2
(45) Date of Patent: Nov. 28, 2023

(54) INFEED DECK CLEANOUT DOOR FOR A HEADER

(71) Applicant: CNH Industrial America LLC, New Holland, PA (US)

(72) Inventors: Jeffrey D. Thomas, Gordonville, PA (US); Benjamin Kemmerer, Hamburg, PA (US); Joel T. Cook, Akron, PA (US); Blaine R. Noll, Fleetwood, PA (US); Herbert M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 751 days.

(21) Appl. No.: 16/838,631

(22) Filed: Apr. 2, 2020

(65) Prior Publication Data

US 2020/0315096 A1 Oct. 8, 2020

Related U.S. Application Data (60) Provisional application No. 62/828,070, filed on Apr. 2, 2019.

(51) Int. Cl.
| | | |
|---|---|---|
| *A01D 75/18* | (2006.01) | |
| *A01D 41/14* | (2006.01) | |
| *A01D 41/06* | (2006.01) | |

(52) U.S. Cl.
CPC ........... *A01D 75/187* (2013.01); *A01D 41/06* (2013.01); *A01D 41/14* (2013.01)

(58) Field of Classification Search
CPC ...... A01D 41/14; A01D 34/003; A01D 47/00; A01D 75/187; A01D 41/06; A01F 12/16
See application file for complete search history.

(56) References Cited

U.S. PATENT DOCUMENTS

| | | | |
|---|---|---|---|
| 2,657,093 A | 10/1953 | Kucera | |
| 3,805,798 A * | 4/1974 | Girodat | A01F 12/16 460/106 |
| 4,070,059 A | 1/1978 | Ksenych | |
| 4,846,244 A | 7/1989 | Rosenfeld | |
| 5,882,257 A | 3/1999 | Cooksey et al. | |
| 7,470,180 B2 * | 12/2008 | Honey | A01D 41/16 56/10.2 J |
| 2007/0186531 A1 * | 8/2007 | Mossman | A01D 61/002 56/119 |

FOREIGN PATENT DOCUMENTS

| | | |
|---|---|---|
| JP | H11346549 A | 12/1999 |
| JP | 5394177 B2 | 10/2013 |

* cited by examiner

*Primary Examiner* — Adam J Behrens
*Assistant Examiner* — Madeline I Runco
(74) *Attorney, Agent, or Firm* — Peter K. Zacharias (57) ABSTRACT

A clean out system of a header for an agricultural vehicle. The header includes a frame with a floor having at least one cutout for allowing an unwanted material to pass therethrough. The clean out system includes at least one door configured for pivotally connecting to the floor and selectively engaging with the at least one cutout, a latching mechanism connected to the at least one door and configured for securing the at least one door to the frame, and at least one actuating member operably connected to the at least one door and configured for selectively latching the latching mechanism and pivoting the at least one door in between an open position and a closed position.

17 Claims, 6 Drawing Sheets

INFEED DECK CLEANOUT DOOR FOR A HEADER

BACKGROUND OF THE INVENTION

The present invention pertains to headers and, more specifically, to an infeed door of an infeed deck of a header.

A typical header generally includes an infeed frame, a pair of end dividers at the lateral ends of the infeed frame, a floor such as a deck, a cutter to remove crop material from the field, and a conveyor to transport the cut crop material to the feeder housing for further downstream processing in the combine. Generally, the components of a header are specifically optimized to harvest a particular kind of crop. For instance, the header may be in the form of a draper header which has a cutter bar, a draper belt, and a rotating reel with tines or the like in order to harvest a bushy or fluffy crop, such as soy beans or canola. Alternatively, the header may be in the form of a corn header which includes an auger and row units with snouts, gathering chains, and stalk rolls in order to harvest corn.

During operation of the header, the bottom floor or deck of the header may collect dust and debris as the crop material is transported from the header into the header. Thereby, to clean out the infeed deck and allow unwanted material to exit the infeed deck, a header may additionally include one or more cutouts and covers or hinged doors that selectively coverup the cutouts. The cleanout doors can be connected to the underside of the infeed deck, for example, by bolts, latches, and/or hinges. Generally, an operator must crawl underneath the header to remove each cleanout door. As can be appreciated, crawling under the header in order to clean out the infeed deck may be cumbersome and time-consuming.

What is needed in the art is a cost-effective and easy-to-use cleanout door to clean out the infeed deck of the header.

SUMMARY OF THE INVENTION

In one exemplary embodiment formed in accordance with the present invention, there is provided a header which generally includes a frame having a floor with at least one cutout therein and at least one door or cover that is pivotally attached to the floor. The header may also include a latching mechanism and an actuating member to selectively unlatch the latching mechanism and pivot the door. The latching mechanism may include a latch connected to the door and a bar or linkage that is interconnected between the latch and the actuating member.

In another exemplary embodiment formed in accordance with the present invention, there is provided a clean out system of a header for an agricultural vehicle. The header includes a frame with a floor having at least one cutout for allowing an unwanted material to pass therethrough. The clean out system includes at least one door configured for pivotally connecting to the floor and selectively engaging with the at least one cutout, a latching mechanism connected to the at least one door and configured for securing the at least one door to the frame, and at least one actuating member operably connected to the at least one door and configured for selectively latching the latching mechanism and pivoting the at least one door in between an open position and a closed position.

In yet another exemplary embodiment formed in accordance with the present invention, there is provided a header for an agricultural vehicle. The header includes a frame having a floor with at least one cutout for allowing an unwanted material to pass therethrough. The header also includes at least one door pivotally connected to the floor and configured for selectively engaging with the at least one cutout and a clean out system connected to the frame. The clean out system includes a latching mechanism connected to the at least one door and configured for securing the at least one door to the frame, and at least one actuating member operably connected to the at least one door and configured for selectively latching the latching mechanism and pivoting the at least one door in between an open position and a closed position.

In yet another exemplary embodiment formed in accordance with the present invention, there is provided a method for cleaning a header for an agricultural vehicle. The header includes a frame with a floor having at least one cutout for allowing an unwanted material to pass therethrough. The method includes a step of providing a clean out system. The clean out system includes at least one door configured for pivotally connecting to the floor and selectively engaging with the at least one cutout. The clean out system also includes a latching mechanism connected to the at least one door and configured for securing the at least one door to the frame, and at least one actuating member operably connected to the at least one door. The latching mechanism includes at least one latch connected to the at least one door and at least one elongated member rotatably connected to the frame and interconnected in between the at least one latch and the at least one actuating member. The method also includes the step of moving the at least one elongated member in a first direction, by the at least one actuating member, to pivot the at least one door into a closed position and latch the latching mechanism for preventing the unwanted material to pass through the at least one cutout. The method also includes the step of moving the at least one elongated member in a second direction, by the at least one actuating member, to unlatch the latching mechanism and pivot the at least one door into an open position for allowing the unwanted material to pass through the at least one cutout.

One possible advantage of the exemplary embodiment of the pivoting infeed door is that an operator may easily and efficiently open or close the door without needing to crawl underneath the header to manually reposition the door.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the header and/or components thereof are usually determined with reference to the direction of forward operative travel of the header, but again, they should not be construed as limiting.

Referring now to the drawings, and more particularly to FIGS. 1-4, there is shown an exemplary embodiment of a header 100 which is removably connected to an agricultural vehicle 10. The agricultural vehicle 10 may be in the form of any desired agricultural vehicle 10, such as a combine or self-propelled windrower.

The header 100 generally includes a frame 102, at least one door 110, and a clean out system 120, 130 composed of a latching mechanism 120 and at least one actuating member 130. The header 100 may further include a pair of end dividers, a cutter to remove the crop material from the field, and a conveyor to transport the cut crop material to the feeder housing for further downstream processing in the header. The header 100 may be in the form of any desired header, such as a draper header. For instance, if the header 100 is in the form of a draper header, the header 100 may further include a cutter bar, a draper belt, and a rotating reel with tines (not shown).

The frame 102 of the header 100 may be in the form of a main frame of the header or an infeed frame which is connected to the main frame of the header 100. As shown, the frame 102 is in the form of an infeed frame 102. The infeed frame 102 of the header 100 may include a front end and a rear end, a floor 104, e.g. an infeed deck 104, and one or more arms 106 extending from the rear end to the front end of the infeed frame 102. The infeed deck 104 may have at least one cutout 105, such as a pair of cutouts 105 therein. Each cutout 105 allows material, for example unwanted material in the form of dust, debris, crop material, etc., to exit the floor 104 of the header 100. The infeed frame 102 may also include at least one hinge 108 which pivotally connects each cleanout door 110 to the floor 104 of the infeed frame 102. For instance, a pair of hinges 108 may each couple the front end of the cleanout doors 110 to the infeed frame 102.

Each cleanout door 110 is pivotally connected to the floor 104 of the infeed frame 102 via the hinge(s) 108. Each cleanout door 110 is configured for selectively engaging with each cutout 105. It should be appreciated that each cleanout door 110 may engage with each cutout 105 by selectively fitting within the perimeter of the cutout 105 and/or covering, e.g. overlapping, the cutout 105. Hence, each cleanout door 110 may pivot in between a closed position in which the unwanted material is prevented from passing through a respective cutout 105 and an open position in which a given cleanout door 110 at least partially disengages, e.g. uncovers, a respective cutout 105 so that the unwanted material may pass through the cutout 105 and out of the infeed frame 102 of the header 100. For instance, each cleanout door 110 may be in the form of an infeed deck cleanout door 110, which pivotally uncovers the cutout 105 in the open position in order for the infeed deck 104 to be cleaned out. It should be appreciated that the header 100 may include one, two, four, or more cleanout doors 110 which may each be associated with one or more corresponding cutout(s) 105. As shown, the header 100 includes a pair of cleanout doors 110 that are disposed on either side of the arm 106. Each cleanout door 110 may be solid or perforated, for example having through-holes in at least a portion of the body of the cleanout door 110. Each cleanout door 110 may be comprised of any desired material. It should be appreciated that the cleanout door(s) 110 may be incorporated as part of the clean out system.

The latching mechanism 120 is connected to each cleanout door 110 and selectively secures each cleanout door 110 to the floor 104 of the infeed frame 102. The latching mechanism 120 includes at least one latch 122 connected to a respective cleanout door 110 and at least one elongated member 124 that is rotatably connected to the infeed frame 102 and interconnected in between each latch 122 and the actuating member 130. Thereby, the actuating member 130 may rotate the elongated member 124 to selectively latch each latch 122 for securing or pivoting each cleanout door 110 in between the open and closed positions. The header 100 may include two latches 122 that are each coupled to a respective cleanout door 110. Alternatively, the elongated member 124 and each cleanout door 110 may be connected by only one or more than two latches 122.

Each latch 122 may be movably coupled with the elongated member 124. For instance, each latch 122 may at least partially wrap around or pivotally connect to the elongated member 124. In the present exemplary embodiment, each latch 122 may be in the form of an over-center latch 122 that includes a base 122B that is connected to each cleanout door 110 and a linkage 122H which is pivotally connected to the base 122B and coupled with the elongated member 124. Each over-center latch 122 may also include a pin that pivotally connects the linkage 122H and the base 122B. Alternatively, the linkage 122H may include an integrated pin (not shown). Each base 122B may be in the form of a bracket 122B, which is connected to the cleanout door 110 via one or more fasteners. Each linkage 122H may be in the form of any desired linkage, such as a hook 122H which at least partially or completely wraps around the elongated member 124. Alternatively, the linkages 122H may be pivotally attached to the elongated member 124 by one or more fasteners. The bases 122B and the linkages 122H may be composed of any desired material.

The elongated member 124 may mount each latch 122, and the elongated member 124 may fixedly or pivotally mount the actuating member 130. Additionally, the elongated member 124 can be moveably, e.g. rotatably, connected to the infeed frame 102. The elongated member 124 may be in the form of a linkage bar. The bar 124 may include lateral ends, a middle section, and a pair of elongated "U"-shaped sections which couple with the hooks 122H of the over-center latches 122. It should be appreciated that the elongated member 124 may be comprised of multiple sections or a single member. The elongated member 124 may comprise any desired material.

Figure 4:
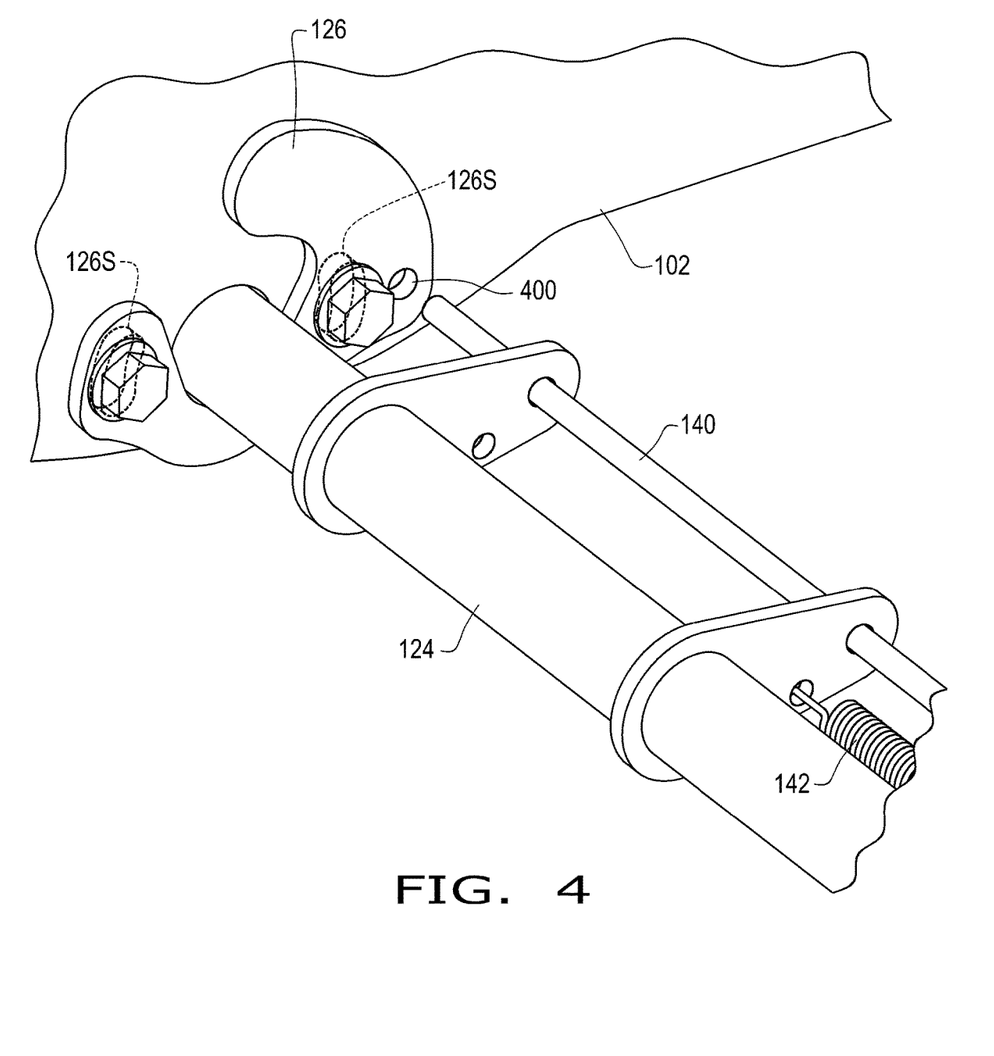
FIG. 4 illustrates another side perspective view of the header of FIGS. 1-3.

The header 100 may further include one or more plates 126 that moveably mount the elongated member 124 so that the elongated member 124 may rotate relative to the infeed frame 102. The elongated member 124 may fit within one or more open slots or grooves in the infeed frame 102, and the plate(s) 126 may extend under elongated member 124 to close the slots in the infeed frame 102 and support the elongated member 124. Each plate 126 may include at least one slot 126S so that the plate 126 is adjustably mounted onto the infeed frame 102, via one or more fasteners (FIG. 4). Hence, adjusting the position of the plate(s) 126, will in turn adjust the resting position of the elongated member 124 in order to adjust a closing force of the latching mechanism 120.

The actuating member 130 is operably connected to and pivots each cleanout door 110 by way of the elongated member 124 and each respective over-center latch 122. The actuating member 130 includes a first end, e.g. rear end, and a second end, e.g. front end, that is operably connected to the elongated member 124. Furthermore, the actuating member 130 can be pivotally connected to an end of the elongated member 124 by way of a pin or bolt. The actuating member 130 may be in the form of a handle 130, which may be manually manipulated to rotate the elongated member 124. It should be appreciated that the header 100 may include more than one actuating member 130. The actuating member 130 may comprise any desired material.

The header 100 may also include one or more locking members 140 connected to the actuating member 130 and selectively connected the infeed frame 102. The locking member 140 may move between a locked position (FIG. 1) in which the at least one locking member 140 is connected to the lateral end plate 126 and/or the infeed frame 102 and an unlocked position (FIGS. 3-4) in which the at least one locking member 140 is disconnected from the lateral end plate 126 and/or the infeed frame 102. Thereby, the locking member 140 prevents the actuating member 130 from rotating the elongated member 124 in the locked position and permits the actuating member 130 to rotate the elongated member 124 in the unlocked position. The locking member 140 may be in the form of a locking rod 140 that is pivotally connected to the actuating member 130 and selectively connected to the infeed frame 102. More particularly, the locking rod 140 may selectively connect to the infeed frame 102, for example, by being slid into and out of a receiving hole 400 in the lateral end plate 126 (FIG. 4). It is conceivable that the infeed frame 102 may include the receiving hole 400, instead of the lateral end plate 126.

Figure 1:
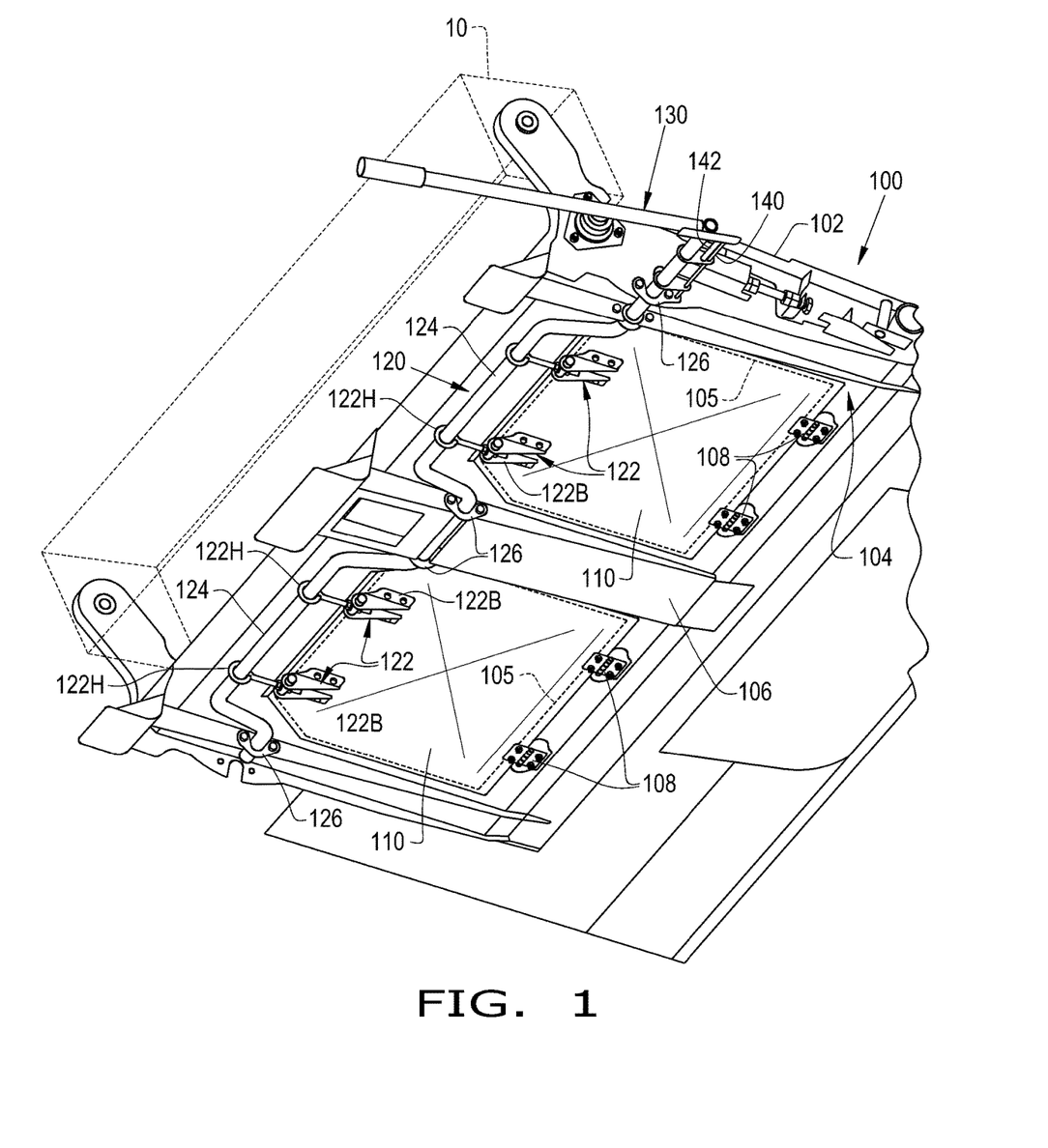
FIG. 1 illustrates a bottom perspective view of an exemplary embodiment of a header including an infeed deck, at least one door, a latching mechanism with over-center latches, and an actuating member, in accordance with an exemplary embodiment of the present invention.
Figure 2:
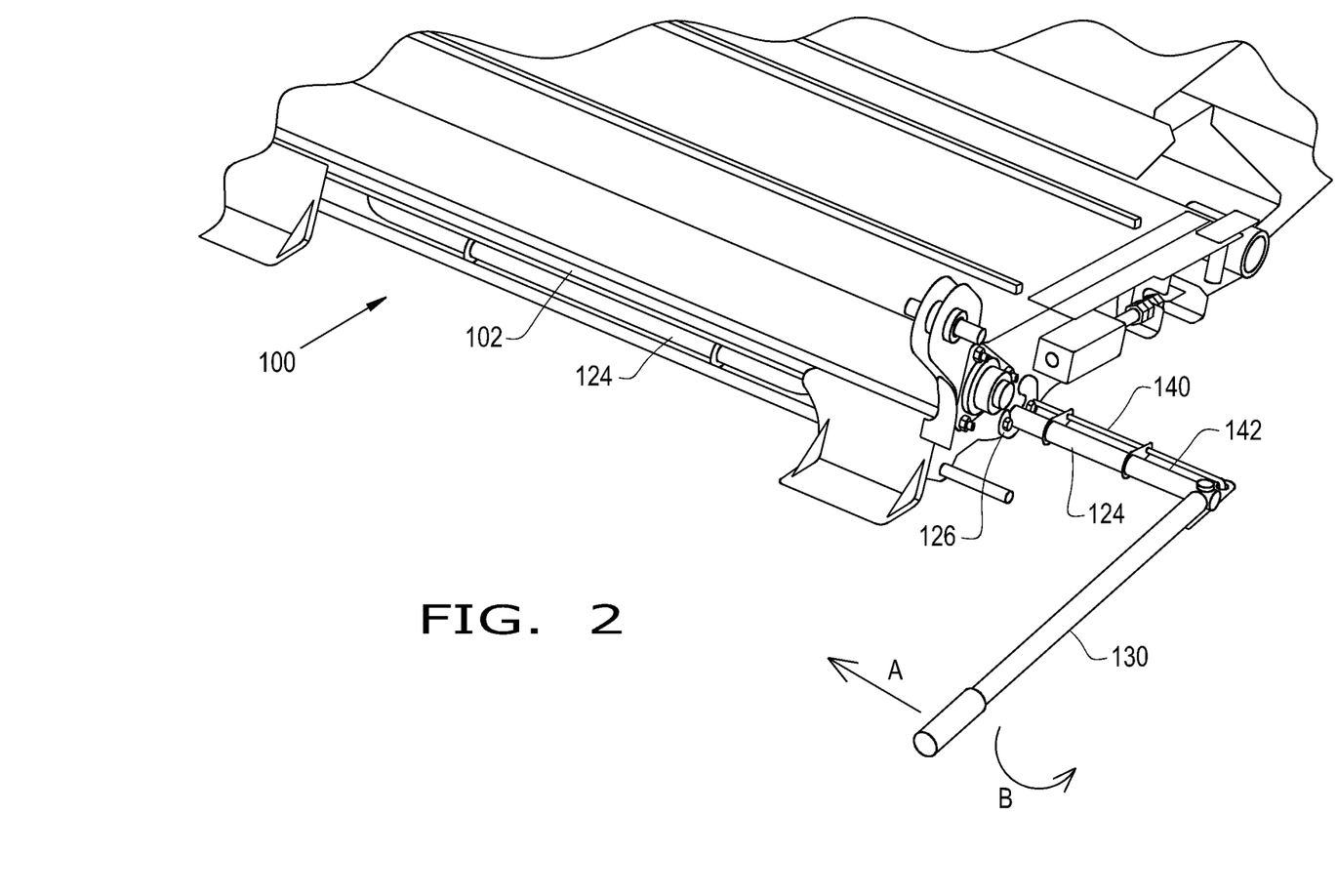
FIG. 2 illustrates a side perspective view of the header of FIG. 1.
Figure 3:
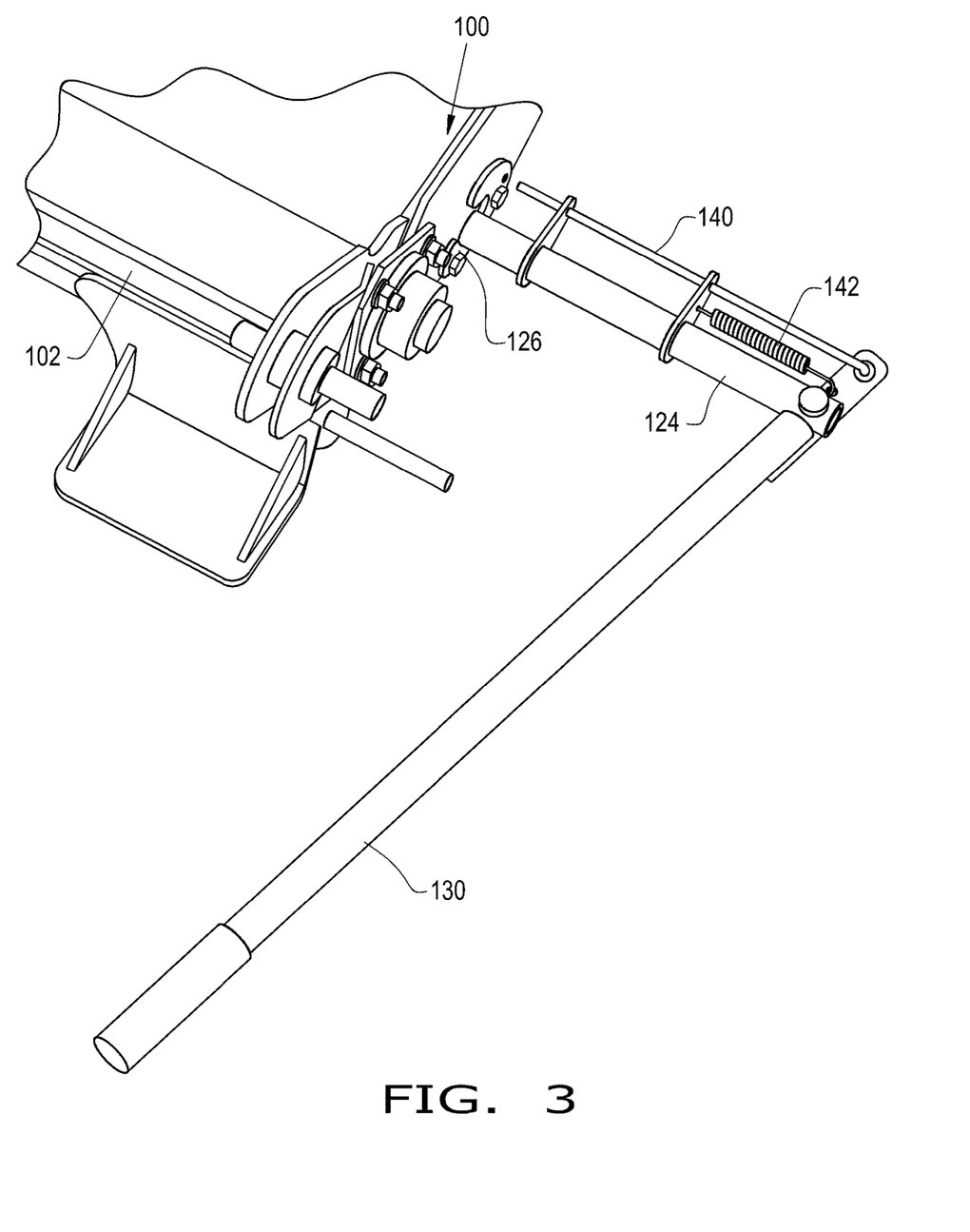
FIG. 3 illustrates another side perspective view of the header of FIGS. 1-2.

Additionally, the header 100 may further include a biasing member 142 which is connected to the actuating member 130. The biasing member 142 may apply a biasing force onto the actuating member 130 such that the locking member 140 is biased to remain in the locked position (FIG. 1). Thereby, the biasing member 142 assists in keeping the locking rod 140 within the receiving hole 400 of the lateral end plate 126. The biasing member 142 can be in the form of a hydraulic, electric, or pneumatic cylinder or a coil spring. As shown, the biasing member 142 is in the form of a spring 142 that is connected in between the elongated member 124 and the actuating member 130.

The actuating member 130 may dually function to (dis) engage the locking member 140 and rotate the elongated member 124 in order to open or close and latch the cleanout doors 110. Hence, the actuating member 130 is movable in a first direction A to unlock the locking member 140; and upon unlocking the locking member 140, the actuating member 130 is movable in a second direction B for rotating the elongated member 124. For example, the end of the actuating member 130 may be pivoted inwardly A toward the right side of the infeed frame 102, which moves the locking member 140 outwardly, outside of the receiving hole 400. Then, the actuating member 130 may be pushed downwardly B in order to downwardly rotate the elongated member 124, which in turn unlatches the latches 122 and opens the cleanout doors 110.

In another exemplary embodiment, the actuating member 130 may be in the form of one or more actuators connected to the infeed frame 102 and elongated member 124. The one or more actuators can be mounted onto each lateral end of the elongated member 124 and connected to the lateral end(s) of the infeed frame 102. Additionally or alternatively, the actuator(s) may be connected to the elongated member 124 at a region adjacent to the linkages 122H of the over-center latches 122. The actuators can be in the form of hydraulic, electric, or pneumatic cylinders or motors.

Figure 5:
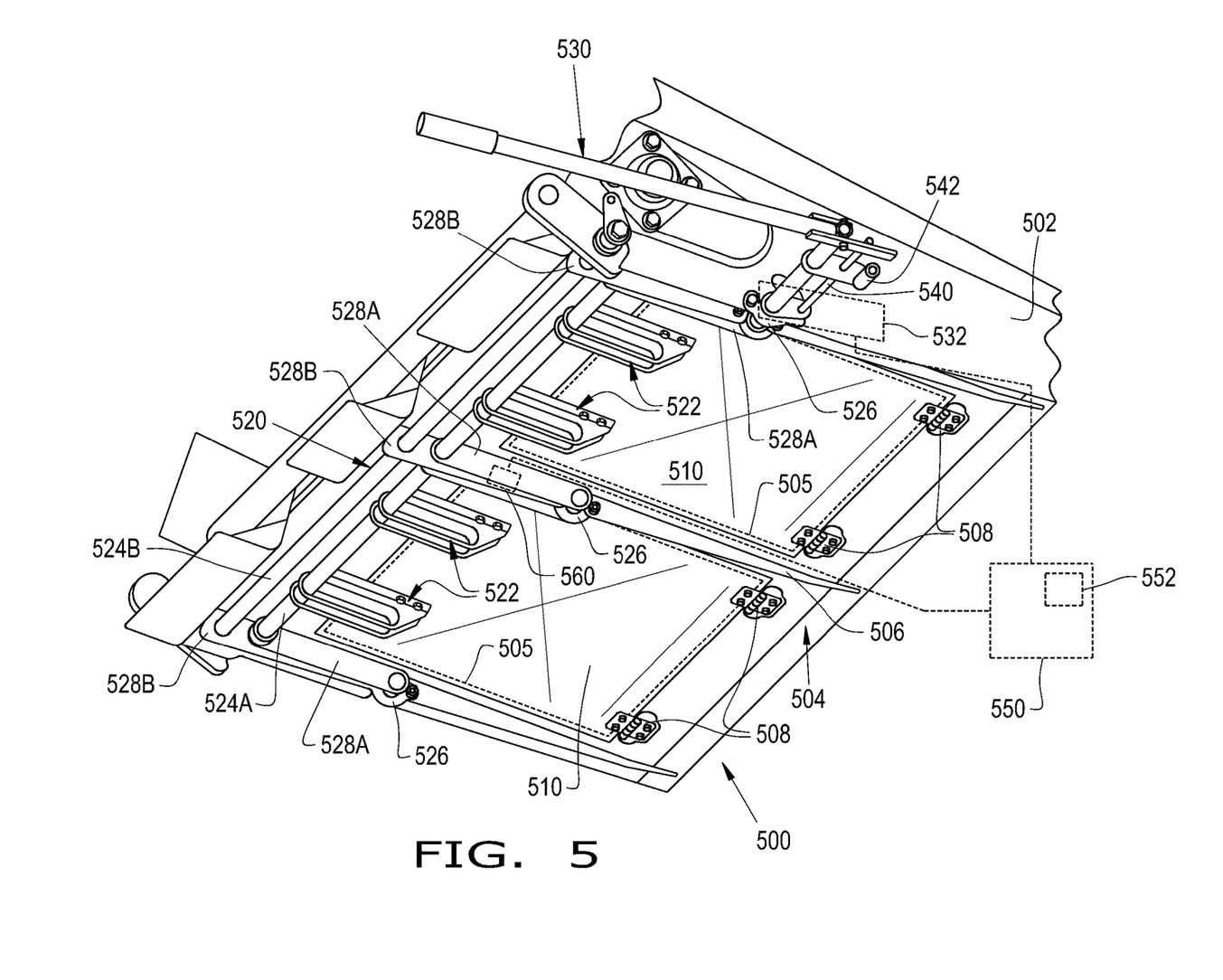
FIG. 5 illustrates a bottom perspective view of another exemplary embodiment of a header including an infeed deck, at least one door, a latching mechanism with slotted latches, and an actuating member, in accordance with an exemplary embodiment of the present invention.

Referring now to FIG. 5, there is shown another exemplary embodiment of a header 500 which is substantially similar to the header 100, except that the infeed deck clean out system 520, 530 includes a latching mechanism 520 with slotted latches 522 and a separate linkage rod weld assembly which includes at least one elongated member in the form of a pair of elongated linkage bars 524A, 524B that are mechanically linked to each other. Like components have been identified with like reference characters, except for the 500 series designation.

Each slotted latch 522 may include a base connected to the cleanout door 510 and a pair of slots which extend around the first linkage bar 524A. Each slot of a respective slotted latch 522 may be open such that the slot only partially surrounds the first linkage bar 524A, or each slot 522 may be closed such that the slot surrounds and contacts the first linkage bar 524A throughout the motion of the first linkage bar 524A. The inner perimeter of the slots of the slotted latches 522 may limit the travel of the first linkage bar 524A. The slots of the slotted latches 522 may have any desired cross-section, such as an elliptical cross-section. It should be appreciated that each slotted latch 522 may include only one slot or more than two slots. Each slotted latch 522 may be in the form of any desired latch, bracket, plate, or interconnecting member that links the cleanout doors 510 to the first linkage bar 524A.

The first linkage bar 524A is pivotally connected to the infeed frame 502 and the actuating member 530 and coupled with the slotted latch 522. The second linkage bar 524B is pivotally connected to the infeed frame 502 and mechanically linked to the first linkage bar 524A. Since the linkage bars 524A, 524B are mechanically linked, when the first linkage bar 514A rotates to close the cleanout doors 510, the second linkage bar 524B moves therewith and adds an additional closing force to secure the cleanout doors 510 in the closed position.

The first and second linkage bars 524A, 524B are coupled to the infeed frame 502 by a weld assembly which includes a series of adjustable mounts, such as adjustable plates 526 and/or pivoting mounting arms 528A, 528B. For example, the adjustable plates 526 may mount the mounting arms 528A, 528B to the lateral ends and middle of the infeed frame 502. The first mounting arms 528A pivotally connect the first linkage bar 524A to the infeed frame 502, and the second mounting arms 528B pivotally connect the second linkage bar 524B to the infeed frame 502. Each linkage bar 524A, 524B can be composed of a single monolithic bar or multiple adjoining sections, which may be welded to one another. Each mounting arm 528A, 528B can be in the form of elongated plates, such as rectangular plates.

Similarly to the plates 126, as discussed above, the plates 526 may include one or more slots so that the plates 526 can be adjustable in order to alter the closing force applied by the first linkage bar 524A onto the slotted latches 522. The lateral end plate 526 may also include a receiving hole for receiving the locking member 540, similar to the receiving hole 400 of the lateral end plate 126. It should be appreciated that the linkage mechanism 520 may include one or more bearings connected in between the plates 526 and mounting arms 528A, 528B.

The one or more actuating members 530 are operably connected to the first and second linkage bars 524A, 524B via the plate 526 and the mounting arms 528A, 528B. The actuating member 530 may rotate the first linkage bar 524A which correspondingly rotates the second linkage bar 524B and selectively latches the slotted latches 522 in order to open or close the cleanout doors 510. As discussed above, the actuating member 530 may be in the form of a handle 530 and may include the locking member 540 and the biasing member 542. The front end of the handle 530 may be operably connected to the linkage bars 524A, 524B via the mounting arms 528A, 528B.

In another exemplary embodiment, the at least one actuating member 530 may alternatively be in the form of one or more actuators 532, such as a hydraulic, electric, or pneumatic cylinder or motor. Each actuator 532 may be connected to the lateral side of the infeed frame 502 and operably coupled with the first linkage bar 524A by way of the respective mounting arm 528A. It is conceivable that the header 500 may additionally or alternatively include one or more actuators, such as cylinders, that are connected to one or both of the linkage bars 524A, 524B and to the underside of the infeed frame 102. It should be appreciated that the actuating member 130, 530 of either header 100, 500 may include a cylinder or motor and/or a handle.

In another exemplary embodiment, the agricultural vehicle or header 100, 500 may further include an electronic control unit (ECU) and at least one sensor. By way of example only, the header 500 is shown to include an ECU 550 and at least one sensor 560; however, either header 100, 500 may include the ECU and sensor(s). For example, if the header 500 is equipped with an actuator 532, the ECU 550 may automatically actuate the actuator 532 to open or close the cleanout doors 510 in response to the signal of the sensor 560 and/or an operator command which is inputted into a user interface. It should be appreciated that the ECU 550 and sensor 560 may be incorporated as part of the clean out system or infeed of either header 100, 500.

The ECU 550 can be operably connected to each actuator 532 and to the sensor(s) 560. The ECU 550 may also include a tangible computer readable medium, e.g. memory 552, for storing software code or instructions. The ECU 550 may be in the form of any desired ECU or controller, and the ECU 550 may be incorporated into existing hardware and/or software of the agricultural vehicle or header 500.

The sensor(s) 560 may be connected to the infeed frame 502 and operably connected to the ECU 550. Each sensor 560 may send a feedback signal to the ECU 550 such that the ECU 550 selectively actuates each actuator 532 responsive to the signal provided by the sensor 560. The at least one sensor 560 can be in the form of any desired sensor(s), such as a proximity sensor, an optical sensor, and/or a position sensor. For instance, the infeed or header 500 may include a proximity sensor 560 connected in between the first mounting arm 528A and the infeed frame 502 or second mounting arm 528B such that the proximity sensor 560 registers when the mounting arms 528A, 528B are folded against the infeed frame 502, i.e., when the cleanout doors 510 are in the closed position. Additionally or alternatively, the at least one sensor 560 may also include an optical sensor for sensing a buildup of unwanted material on the infeed frame 502. The optical sensor may be connected to the infeed frame 502 at any desired location, such as adjacent to one of the lateral ends of the infeed frame 502. Furthermore, the at least one sensor may be integrally formed with the actuator 532.

Figure 6:
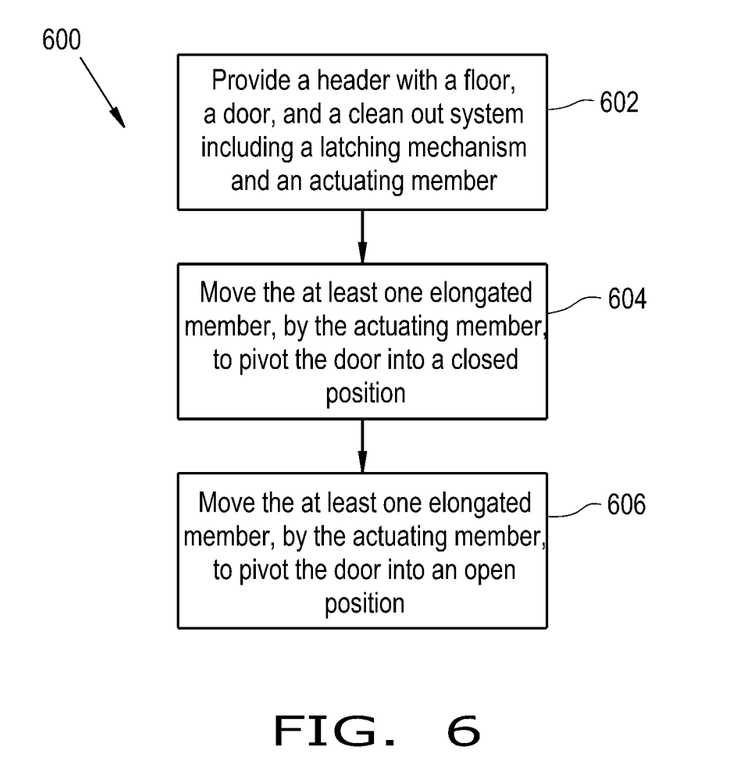
FIG. 6 illustrates a flow diagram of a method for cleaning out the infeed deck of the header, in accordance with an exemplary embodiment of the present invention.

Referring now to FIG. 6, there is shown a flow diagram of a method 600 for cleaning out the infeed deck 504 of the header 500. By way of example only, the method 600 will be discussed with respect to the header 500; however, it should be appreciated that the method 600 may be performed by the header 100. The method 600 may include an initial step of providing the header 100, 500, as discussed above (at block 602). The method 600 may also include a step of moving the at least one elongated member 524A, 524B, by the actuating member 530, 532, in a first direction to pivot the cleanout doors 510 into a closed position and latch the latching mechanism 520 for preventing the unwanted material to pass through the cutouts 505 (at block 604). The method may also include a step of moving the at least one elongated member 524A, 524B in a second direction, by the at least one actuating member 530, 532, to unlatch the latching mechanism 520 and pivot the cleanout doors 510 into an open position for allowing the unwanted material to pass through the cutouts 505 (at block 606). Additionally, the method 600 may further include an initial step of moving the actuating member 530 to unlock the locking member 540. For instance, an operator may pivot the end of the handle 530 inwardly to release the locking member 540 from the plate 126, and then the operator may rotate the handle 530 downwardly or upwardly to open or close the cleanout doors 510, respectively. The method may further include a step of pivoting the handle 530 outwardly away from the lateral end of the infeed frame 102 for locking the locking mechanism 540 within the plate 526, when the cleanout doors 510 are in the closed position. It should be appreciated that the steps of the method 600 may be performed by an operator or the ECU 550 by automatically actuating the actuator 532 in response to a sensor feedback signal and/or an inputted command.

It is to be understood that the steps of the method 600 may be performed by the controller 550 upon loading and executing software code or instructions. The controller 550 may include software code or instructions which are tangibly stored on the tangible computer readable medium 552. The computer readable medium 552 may be in the form of a magnetic medium, e.g., a computer hard drive, an optical medium, e.g., an optical disc, solid-state memory, e.g., flash memory, or other storage media known in the art. Thus, any of the functionality performed by the controller 550 described herein may be implemented in software code or instructions which are tangibly stored on the tangible computer readable medium 552. The controller 550 loads the software code or instructions via a direct interface with the computer readable medium 552 or via a wired and/or wireless network. Upon loading and executing such software code or instructions by the controller 550, the controller 550 may perform any of the functionality described herein.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A clean out system of a header for an agricultural vehicle, the header comprising a frame with a floor having at least one cutout for allowing an unwanted material to pass therethrough, the clean out system comprising:
    at least one door configured for pivotally connecting to the floor and selectively engaging with the at least one cutout;
    a latching mechanism connected to the at least one door and configured for securing the at least one door to the frame, the latching mechanism comprising at least one latch connected to the at least one door and at least one elongated member connected to the frame;
    at least one plate adjustably mounted to the frame and supporting the at least one elongated member, wherein the at least one plate is configured for adjusting a closing force of the latching mechanism; and
    at least one actuating member operably connected to the at least one door and configured for selectively latching the latching mechanism and pivoting the at least one door in between an open position and a closed position.

2. The clean out system of claim 1, wherein the at least one elongated member is rotatably connected to the frame and interconnected in between the at least one latch and the at least one actuating member such that the at least one actuating member rotates the at least one elongated member which selectively latches the at least one latch and pivots the at least one door.

3. The clean out system of claim 2, wherein the at least one actuating member is in the form of a handle comprising a first end and a second end, and the second end of the handle is operably connected to the at least one elongated member.

4. The clean out system of claim 2, further comprising at least one locking member connected to the at least one actuating member and selectively connected the frame, the at least one locking member is configured for moving between a locked position in which the at least one locking member is connected to the frame and an unlocked position in which the at least one locking member is disconnected from the frame, and the at least one actuating member is movable in a first direction to unlock the at least one locking member, and upon unlocking the at least one locking member, the at least one actuating member is movable in a second direction for rotating the at least one elongated member in the unlocked position of the at least one locking member.

5. The clean out system of claim 4, further comprising a biasing member connected to the at least one actuating member and applying a biasing force onto the at least one actuating member such that the at least one locking member is biased to remain in the locked position.

6. The clean out system of claim 2, wherein the at least one latch is in the form of at least one over-center latch comprising a base connected to the at least one door and a linkage pivotally connected to the base and the at least one elongated member.

7. The clean out system of claim 2, wherein the at least one latch is in the form of at least one slotted latch connected to the at least one door, and the at least one elongated member is in the form of a first linkage bar and a second linkage bar, the first linkage bar is pivotally connected to the frame and to the at least one actuating member and coupled with the at least one slotted latch, and the second linkage bar is pivotally connected to the frame and mechanically linked to the first linkage bar such that the at least one actuating member is configured for rotating the first linkage bar which correspondingly rotates the second linkage bar and selectively latches the at least one slotted latch.

8. The clean out system of claim 7, further comprising an electronic control unit operably connected to the at least one actuating member and at least one sensor operably connected to the electronic control unit and configured for providing a signal to the electronic control unit, and the at least one actuating member is in the form of an actuator such that the electronic control unit automatically actuates the actuator in response to the signal of the at least one sensor.

9. A header for an agricultural vehicle, comprising:
    a frame comprising a floor with at least one cutout for allowing an unwanted material to pass therethrough;
    at least one door pivotally connected to the floor and configured for selectively engaging with the at least one cutout; and
    a clean out system connected to the frame and comprising:
        a latching mechanism connected to the at least one door and configured for securing the at least one door to the frame, the latching mechanism comprising at least one latch connected to the at least one door and at least one elongated member connected to the frame;
        at least one actuating member operably connected to the at least one door and configured for selectively latching the latching mechanism and pivoting the at least one door in between an open position and a closed position; and
        at least one locking member connected to the at least one actuating member and selectively connected to the frame, the at least one locking member is configured for moving between a locked position in which the at least one locking member is connected to the frame and an unlocked position in which the at least one locking member is disconnected from the frame, and the at least one actuating member is movable in a first direction to unlock the at least one locking member, and upon unlocking the at least one locking member, the at least one actuating member is movable in a second direction for rotating the at least one elongated member in the unlocked position of the at least one locking member.

10. The header of claim 9, wherein the at least one elongated member is rotatably connected to the frame and interconnected in between the at least one latch and the at least one actuating member such that the at least one actuating member rotates the at least one elongated member which selectively latches the at least one latch and pivots the at least one door.

11. The header of claim 10, wherein the at least one actuating member is in the form of a handle comprising a first end and a second end, and the second end of the handle is connected to the at least one elongated member.

12. The header of claim 9, wherein the clean out system further comprises a biasing member connected to the at least one actuating member and applying a biasing force onto the at least one actuating member such that the at least one locking member is biased to remain in the locked position.

13. The header of claim 10, wherein the clean out system further comprises at least one plate adjustably mounted to the frame and supporting the at least one elongated member, and the at least one plate is configured for adjusting a closing force of the latching mechanism.

14. The header of claim 10, wherein the at least one latch is in the form of at least one over-center latch comprising a base connected to the at least one door and a linkage pivotally connected to the base and the at least one elongated member.

15. The header of claim 10, wherein the at least one latch is in the form of at least one slotted latch connected to the at least one door, and the at least one elongated member is in the form of a first linkage bar and a second linkage bar, the first linkage bar is pivotally connected to the frame and to the at least one actuating member and coupled with the at least one slotted latch, and the second linkage bar is pivotally connected to the frame and mechanically linked to the first linkage bar such that the at least one actuating member is configured for rotating the first linkage bar which correspondingly rotates the second linkage bar and selectively latches the at least one slotted latch.

16. The header of claim 15, further comprising an electronic control unit operably connected to the at least one actuating member and at least one sensor operably connected to the electronic control unit and configured for providing a signal to the electronic control unit, and the at least one actuating member is in the form of an actuator such that the electronic control unit automatically actuates the actuator in response to the signal of the at least one sensor.

17. A method for cleaning a header for an agricultural vehicle, the header comprising a frame with a floor having at least one cutout for allowing an unwanted material to pass therethrough, comprising:
    providing a clean out system comprising at least one door configured for pivotally connecting to the floor and selectively engaging with the at least one cutout, a latching mechanism connected to the at least one door and configured for securing the at least one door to the frame, at least one actuating member operably connected to the at least one door, and at least one locking member connected to the at least one actuating member and selectively connected the frame, wherein the at least one locking member is configured for moving between a locked position in which the at least one locking member is connected to the frame and an unlocked position in which the at least one locking member is disconnected from the frame, and wherein the latching mechanism comprises at least one latch connected to the at least one door and at least one elongated member rotatably connected to the frame and interconnected in between the at least one latch and the at least one actuating member;
    moving the at least one elongated member in a first direction, by the at least one actuating member, to pivot the at least one door into a closed position and latch the latching mechanism for preventing the unwanted material to pass through the at least one cutout;
    moving the at least one elongated member in a second direction, by the at least one actuating member, to unlatch the latching mechanism and pivot the at least one door into an open position for allowing the unwanted material to pass through the at least one cutout;
    moving the at least one actuating member to unlock the at least one locking member; and
    moving the at least one actuating member to lock the at least one locking member.

\* \* \* \* \*